US012072046B2

(12) United States Patent
Casey

(10) Patent No.: US 12,072,046 B2
(45) Date of Patent: Aug. 27, 2024

(54) BRACKET FOR SECURING IN-WALL FIRE SPRINKLER LINE PIPING

(71) Applicant: Daniel M. Casey, Chicago, IL (US)

(72) Inventor: Daniel M. Casey, Chicago, IL (US)

( * ) Notice: Subject to any disclaimer, the term of this patent is extended or adjusted under 35 U.S.C. 154(b) by 0 days.

(21) Appl. No.: 17/542,344

(22) Filed: Dec. 3, 2021

(65) Prior Publication Data

US 2022/0178473 A1    Jun. 9, 2022

Related U.S. Application Data

(60) Provisional application No. 63/155,119, filed on Mar. 1, 2021, provisional application No. 63/121,556, filed on Dec. 4, 2020.

(51) Int. Cl.
*F16L 3/02* (2006.01)
*A62C 35/68* (2006.01)
*F16L 3/237* (2006.01)

(52) U.S. Cl.
CPC ............... *F16L 3/02* (2013.01); *A62C 35/68* (2013.01); *F16L 3/237* (2013.01)

(58) Field of Classification Search
CPC .................................. F16L 3/02; A62C 35/68
See application file for complete search history.

(56) References Cited

U.S. PATENT DOCUMENTS

| 1,285,023 | A | 11/1918 | Burnett |
| 4,826,113 | A | 5/1989 | Winters |
| 6,158,519 | A | 12/2000 | Kretschmer |
| 6,951,324 | B2 | 10/2005 | Karamanos |
| 8,876,067 | B2 | 11/2014 | McAllister |
| 9,334,981 | B2 | 5/2016 | Korcz et al. |
| 2004/0238697 | A1 | 12/2004 | Heath |
| 2006/0180713 | A1 | 8/2006 | Olle et al. |

OTHER PUBLICATIONS

International Search Report and the Written Opinion of the International Searching Authority, in International Patent Application No. PCT/US2/61974, mailed Feb. 16, 2022.

*Primary Examiner* — Paul J Gray
(74) *Attorney, Agent, or Firm* — Barich IP Law Group

(57) ABSTRACT

A bracket for securing fire sprinkler line piping is provided which includes a center panel with attached first and second side flaps positioned at approximately 90 degrees to the center panel. The bracket is insertable between the sidewalls of a ceiling track and sprinkler line pipe is engaged into the pipe guide by using a swivel ring on a threaded rod. Once engaged, the bracket prevents lateral movement of the sprinkler line pipe relative to the ceiling track.

6 Claims, 12 Drawing Sheets

BRACKET FOR SECURING IN-WALL FIRE SPRINKLER LINE PIPING

CROSS-REFERENCE TO RELATED APPLICATIONS

The present application claims the benefit of U.S. Provisional Application No. 63/121,556, filed Dec. 4, 2020, entitled "Bracket For Securing In-Wall Fire Sprinkler Line Piping", and U.S. Provisional Application No. 63/155,119, filed Mar. 1, 2021, entitled "Bracket For Securing In-Wall Fire Sprinkler Line Piping", both of which are hereby incorporated by reference in their entirety.

BACKGROUND OF THE INVENTION

The present invention generally relates to equipment for installing a sprinkler line. More particularly, the present invention relates to a bracket for securing fire sprinkler piping.

In high-rise residential buildings or other buildings, fire protection sprinkler systems are required. In many instances, the fire protection sprinkler systems employ horizontal line piping that is concealed inside interior walls and horizontal sidewall sprinkler heads are used. For aesthetics, the sprinkler heads typically include a two-piece, semi recessed escutcheon plate. One challenge for the installer is to achieve the proper depth inside the wall, so that the sprinkler head is recessed anywhere from $\frac{1}{8}$" to $\frac{1}{2}$" from the finish surface of drywall. Great care is typically taken by the installer by measuring and cutting the line piping and hanging it in its proper location.

During construction, carpenters typically nail a $3\frac{5}{8}$" wide steel top track to the concrete deck, serving as the top plate for interior walls. Although a $3\frac{5}{8}$" wide steel top track is commonly employed, other widths of track may be employed. Next, sprinkler fitters hang their line pipe within that track using a $\frac{3}{8}$" rod and an adjustable swivel ring. Eventually, the carpenters' top track will accept $3\frac{5}{8}$" steel wall studs, which are slotted at the top to accommodate the sprinkler pipe. When the walls are complete, electricians and plumbers run their pipes. When these pipes cross the sprinkler pipe, the sprinkler pipe is commonly nudged to one side or another, which is undesirable because it may alter the depth at which the sprinkler head is recessed in the wall. This may result in additional cost and/or delays as the sprinkler installer may have to revised or alter the sprinkler system piping to once again cause the sprinkler hear to be recessed at its proper depth in the wall.

Unfortunately, the swivel rings that are commonly used to support the sprinkler pipe provide no protection against side-to-side movement. Unfortunately, if the sprinkler head is pushed too deep inside the wall, the outer trim ring will not engage with the inner ring and, more importantly, the sprinkler's spray pattern is obstructed, rendering the system non-code-compliant. Conversely, if the sprinkler head is forced outside the wall, the appearance is unprofessional and unpleasing to the eye. In either event, the installer must typically return to the construction site, drain the system, and address the situation. These extra repairs are inefficient and costly.

BRIEF SUMMARY OF THE INVENTION

One or more of the embodiments of the present invention provide a system and method for securing fire sprinkler line piping. In one embodiment, a bracket includes a center panel, a first side flap disposed at 90 degrees to the center panel, a second side flap also disposed at 90 degrees to the center panel, and a pipe guide positioned along the bottom edge of the bracket. The bracket is insertable between the sidewalls of a ceiling track and a sprinkler line pipe is introduced into the pipe guide. Once the sprinkler line pipe has been placed into the pipe guide, the sprinkler like pipe is secured to the bracket by surrounding the sprinkler line pipe with a swivel ring and then threading the swivel ring on a threaded rod. Once the sprinkler line pipe is secured into the bracket, the bracket prevents the sprinkler like pipe from being laterally displaced relative to the ceiling track.

DETAILED DESCRIPTION OF THE INVENTION

One or more embodiments of the present invention provide a bracket for securing in-wall fire sprinkler line piping. The bracket holds sprinkler pipe solidly at the proper depth inside the wall permanently so that the sprinkler pipe is not undesirably displaced by later construction work. The bracket is used in conjunction with the current sprinkler pipe hanger system (swivel ring). As further described below, the bracket fits snugly inside the top track, making for a quick, easy, one-step installation. The bracket operates to restrict side-to-side movement as a result of other tradesmen installing their product. Additionally, the bracket guides the pipe inside the wall and holds the sprinkler pipe straight in the event of a poorly tapped fitting.

Figure 1:
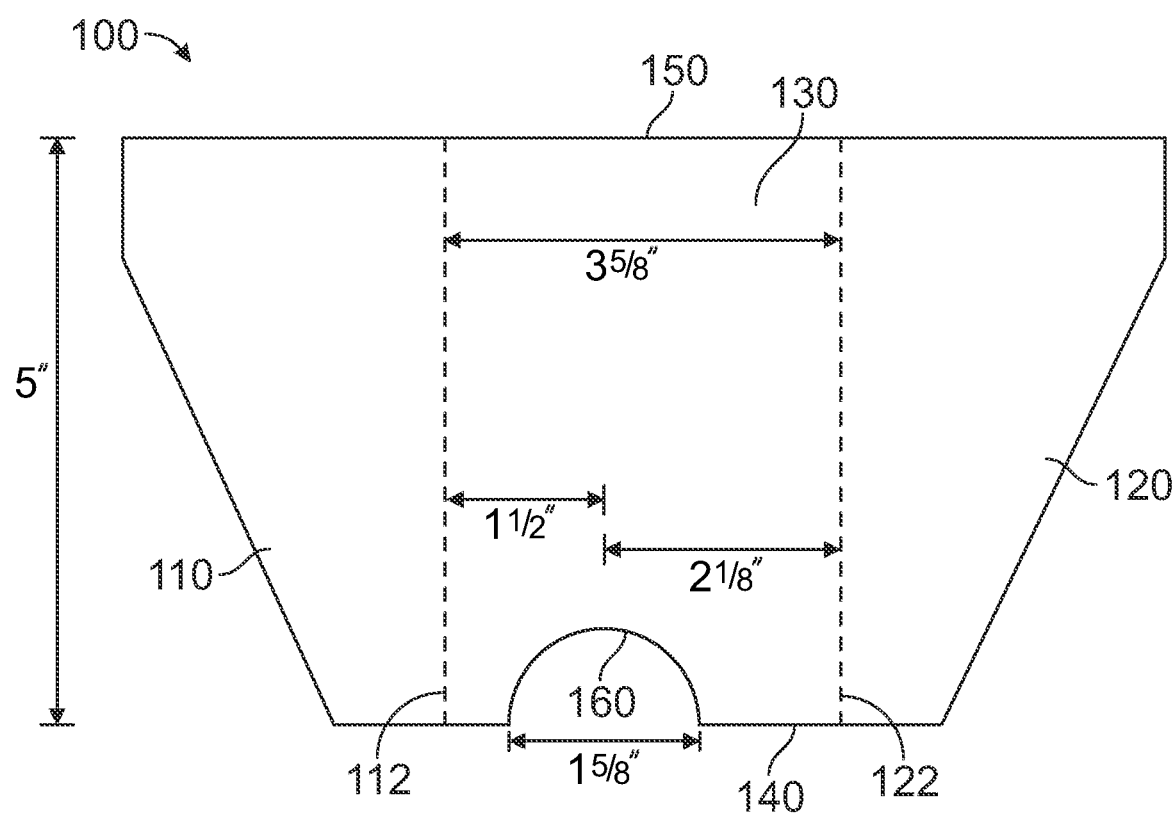
FIG. 1 illustrates a first embodiment of a bracket for securing in-wall fire sprinkler line piping in an unfolded configuration.

FIG. 1 illustrates a first embodiment of a bracket 100 for securing in-wall fire sprinkler line piping in an unfolded configuration. The bracket 100 includes a first side flap 110, a first fold line 112, a second side flap 120, a second fold line 122, a center panel 130, a bottom edge 140, a top edge 150, and a pipe guide 160.

In operation, to alter the bracket 100 from the unfolded configuration shown in FIG. 1 to a folded configuration suitable for insertion in a steel top track, the first side flap 110 is folded backward from the center panel 130 along the first fold line 112 until the first side flap 110 is at an approximately almost 90 degree angle from the center panel 130. Next, the second side flap 120 is folded backward from the center panel 130 along the second fold line 122 until the second side flap 120 is at an approximately almost 90 degree angel from the center panel. The bracket 100 is now in its folded configuration and suitable for insertion to a steel top track.

The top track includes a first side downwardly extending wall and a second side downwardly extending wall that are joined by a top track portion. Next, the bracket 100 is inserted into the steel top track by introducing the top edge 150 between the two downwardly extending walls and into proximity with the top track portion (as shown below in FIG. 2). Once inserted, the first side flap 110 is in contact with the first side downwardly extending wall and the second side flap 120 is in contact with the second side downwardly extending wall. Additionally, the bracket 100 may be retained between the first side downwardly extending wall and the second side downwardly extending wall due to spring force exerted by the side flaps of the bracket onto the surrounding downwardly extending walls.

Once the bracket 100 has been positioned in the top track, a sprinkler pipe may be introduced into the pipe guide 160. Next, a swivel ring is introduced around the sprinkler pipe and attached to a threaded rod that suspends from the ceiling between the first and second side downwardly extending walls of the track. The swivel ring is then tightened on the threaded rod so that the sprinkler pipe is induced upward into the pipe guide 160. Because the bracket 100 is of solid construction, and the swivel ring keeps the sprinkler pipe firmly inserted in the pipe guide 160, the sprinkler pipe is prevented from moving side-to-side relative to the track.

In one embodiment, the bracket 100 is composed of flat steel, preferably 20 gauge or thicker, although other gauges such as 14 and 16 gauge may be employed. The center panel 130 or face is 3⅝" wide and the first side flap 110 and second side flap 120 are preferably 3" wide. The bracket 100 is preferably 5" tall throughout. The 5" height dimension is adjustable to conform to local code and building design, for example, the sidewall sprinkler head may be anywhere from 4" to 6" down from deck as per national fire protection code. Consequently, the height of the bracket 100 may be adjusted to be anywhere between 4" to 6".

In the center panel 130, the pipe guide 160 may be a 1⅝" diameter hole that may be punched or drilled out, and may be offset 5/16" or 0.3125" inches from the vertical center line. In one embodiment, the pipe guide 160 is centered on the bottom of the bracket 100, creating a semicircle. The placement of the pipe guide 160 is important because it guides the top of the sprinkler pipe to its proper depth within the wall.

The 5/16" offset from center is useful when 1¼" pipe is being installed because, depending on the outlet sizes on the 1¼" pipe fittings, the pipe may need to favor one side of the wall or the other. However, the present bracket 100 may easily provide an offset to either side of the wall by rotating the bracket 100 by 180 degrees when inserting the bracket 100 into the track.

The 3⅝" width ensures a snug fit inside the top track. The square bends of the first and second side flaps provide structural integrity and prevent the bracket 100 from folding over as the pipe is drawn up into the pipe guide 160 using the swivel ring. The template for the device is extremely straightforward. It is a simple rectangle, 9⅝" wide by 5" tall. Additionally, the 3" wide side flaps generate a spring force that frictionally engages them with the interior side of the steel track.

In an additional alternative embodiment, the bracket 100 may be composed of a simple rectangle, 9⅝" wide by 5" tall. In this embodiment, the first side flap 110 and second side flap 120 lack the angled cut-out regions shown in FIG. 1 and merely extend straight vertically from the top edge 150 to the bottom edge 140. Otherwise, this alternative embodiment includes the same structures and functions the same as the embodiments described above.

Figure 2:
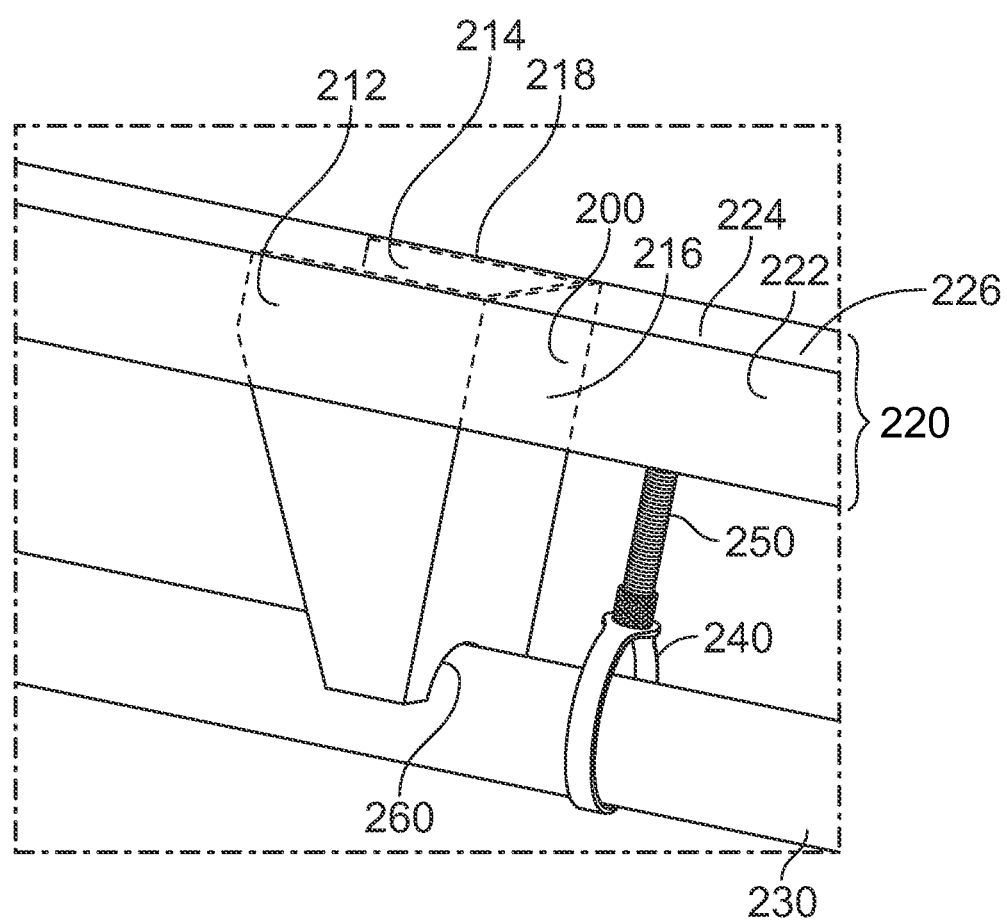
FIG. 2 illustrates the bracket of FIG. 1 in a folded configuration and installed in a ceiling track.

FIG. 2 illustrates the bracket of FIG. 1 in a folded configuration and installed in a ceiling track. FIG. 2 includes a bracket 200, a ceiling track 220, a sprinkler pipe 230, a swivel ring 240, and a threaded rod 250. The bracket 200 includes a first side flap 212, a second side flap 214, a center panel 216, a top edge 218, and a pipe guide 260. The ceiling track 220 includes a first side downwardly extending wall 222, a second side downwardly extending wall 224 and a top track portion 226. It is noted that the downwardly extended walls may also be known as the sidewalls of the track and that the track may be installed on a structural element other than a ceiling, such as wall for example.

As mentioned above, as shown in FIG. 2, the bracket 200 has been folded along the fold lines indicated in FIG. 1 so that the first side flap 212 and second side flap 214 form nearly 90 degree angles with the center panel 216. The first side flap 212 and second side flap 214 may then be slightly mechanically induced toward each other by an installer so that the bracket 200 may be inserted into the ceiling track 220 as shown so that the top edge 218 is brought into proximity and/or abutment with the top track portion 226 that runs along the ceiling. The first side flap 212 and second side flap 214 may then be released be the installer and a spring force provided by the folding configuration of the first side flap 212 and second side flap 214 relative to the center panel 216 may then induce the first side flap 212 and second side flap 214 into contact and/or frictional engagement with the ceiling track's 220 first side downwardly extending wall 22 and second side downwardly extending wall 224, respectively.

Next, the sprinkler pipe 230 is introduced into the pipe guide 260. Then, the swivel ring 240 is introduced around the sprinkler pipe and attached to the threaded rod 250 that suspends from the ceiling between the first and second side downwardly extending walls of the track. The swivel ring 240 is then tightened on the threaded rod 250 so that the sprinkler pipe 230 is firmly seated in the pipe guide 260. Once the swivel ring 240 is tightened, the sprinkler pipe 230 is prevented from moving side-to-side relative to the ceiling track 220.

Figure 3:
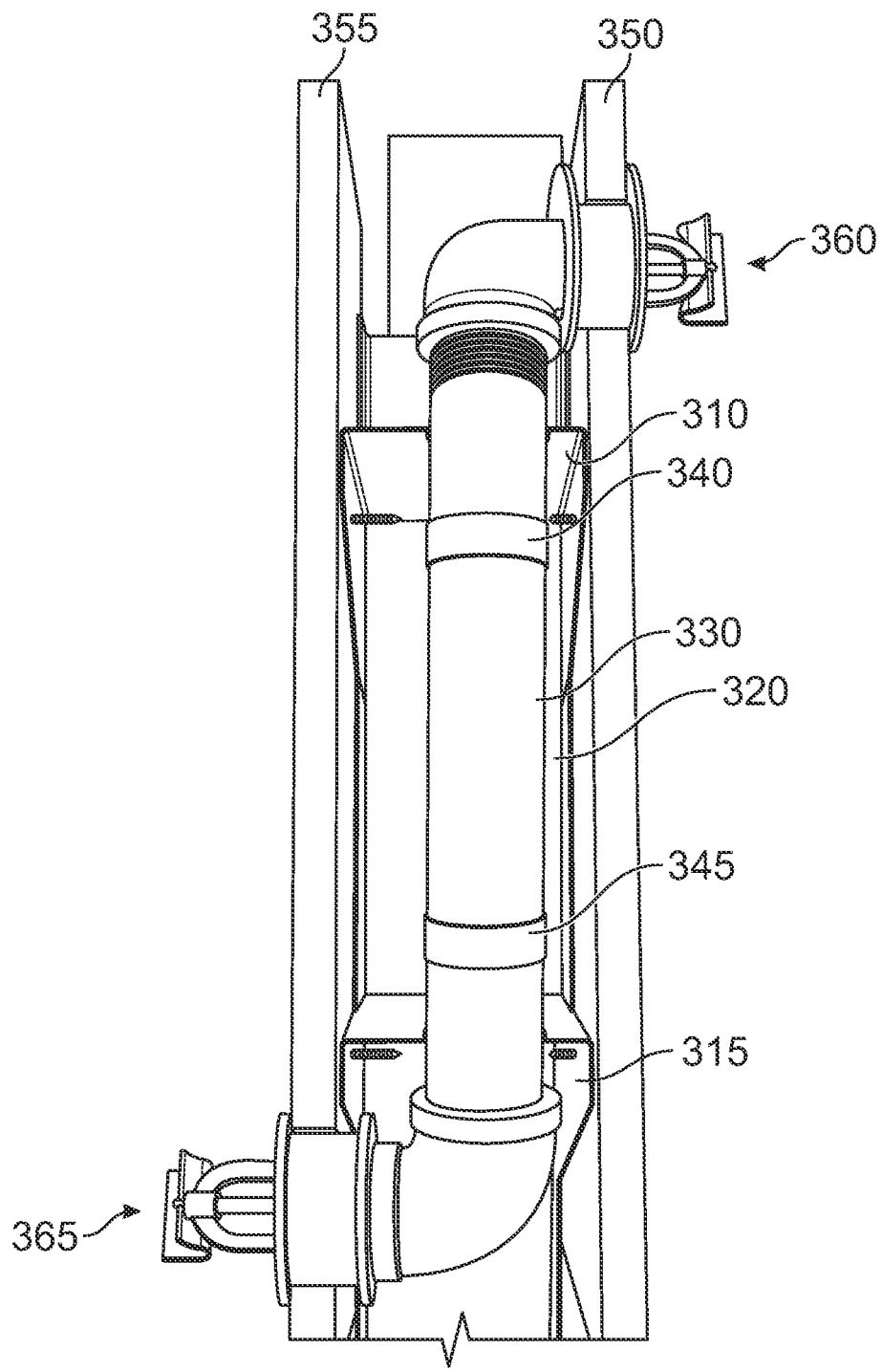
FIG. 3 illustrates a mockup of the use of the bracket of FIG. 1 used to install sprinkler pipe.

FIG. 3 illustrates a mockup 300 of the use of the bracket 100 of FIG. 1 used to install sprinkler pipe. FIG. 3 includes a first bracket 310, a second bracket 315, a ceiling track 320, a sprinkler pipe 330, a first swivel ring 340, a second swivel ring 345, a first drywall panel 350, a second drywall panel 355, a first sprinkler head 360, and a second sprinkler head 365.

As shown in FIG. 3, the first bracket 310 and second bracket 315 have been introduced between the sidewalls of the ceiling track 350. Further, the sprinkler pipe 330 has been introduced into the pipe guides of the first bracket 310 and second bracket 315. Further, as discussed above, the first swivel ring 340 and second swivel ring 345 have been engaged with threaded bolts to secure the sprinkler pipe 330 securely into the pipe guides. As shown, the first drywall panel 350 and the second drywall panel 355 are installed on opposite sides of the ceiling track 350 and may be attached to the respective side walls of the ceiling track 350.

As mentioned above, slots are formed in the first drywall panel 350 to allow the positioning of the first sprinkler hear 360 and in the second drywall panel 355 to allow the positioning of the second sprinkler head 365. As shown in FIG. 3, the offset of the pipe guides allows fixtures of different sizes to be used for the first sprinkler head 360 and second sprinkler head 365.

Thus, FIG. 3 depicts a mock-up of a typical 3⅝" wall with 1¼" sprinkler pipe run through it and ⅝" drywall on either side. Notice the fittings facing opposite directions. This is common practice in the fire suppression business. It allows the rooms on both sides of one wall to be protected. Two brackets are in use, ensuring that the pipe runs parallel inside the wall. Notice the pipe at a 5/16" offset from the midpoint between the walls—matching the offset in the bracket. A sidewall sprinkler head is screwed directly into a ½" female outlet in the bottom fitting. In the top fitting, a 1" side outlet is used with a 1' by ½" bushing, which accepts the ½" sprinkler head.

Figure 4:
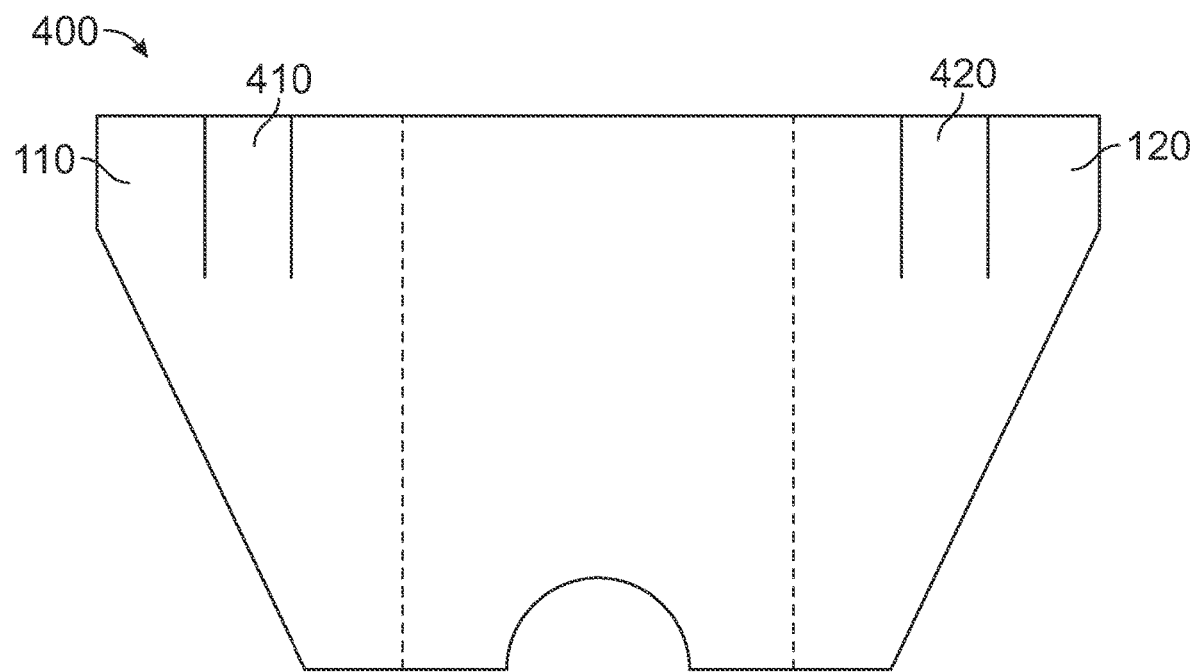
FIG. 4 illustrates an alternative embodiment with clips.

FIG. 4 illustrates an alternative embodiment 400 with clips. The embodiment of FIG. 4 is similar to the embodiment of FIG. 1, but includes a first clip 410 on the first side flap 110, and a second clip 420 on the second side flap 120. As shown, the clips 410, 420 may be fabricated out of the side flaps 110, 120, and may provide an extra-secure fit onto the top track when installed (as shown below). The clips 410, 420 may be formed by snipping the side flaps 110,120 twice in the locations shown and then bending the middle section of the clops 410, 420 to form a slight contour that may frictionally engage the bracket with the ceiling track.

In one embodiment, the clips 410, 420 may generate a spring force to engage the exterior side of the steel track while pulling the non-snipped portion of the side flaps 110,120 into contact with the interior side of the steel ceiling track.

In another embodiment, a small hole may be drilled through the clips to accommodate a self-tapping screw. When the screw is installed, the bracket may be affixed to the top track. The steel side wall of the ceiling track may also be drilled and the screw may pass through both the clip and the steel side wall. Alternatively, a bolt or other fastening device may be employed.

Additionally, although FIG. 4 illustrates the use of the clips with an embodiment of the bracket having a centered pipe guide (as detailed below in FIG. 5), the clips may also be employed in the embodiment of FIG. 1 or any embodiment herein.

Figure 5:
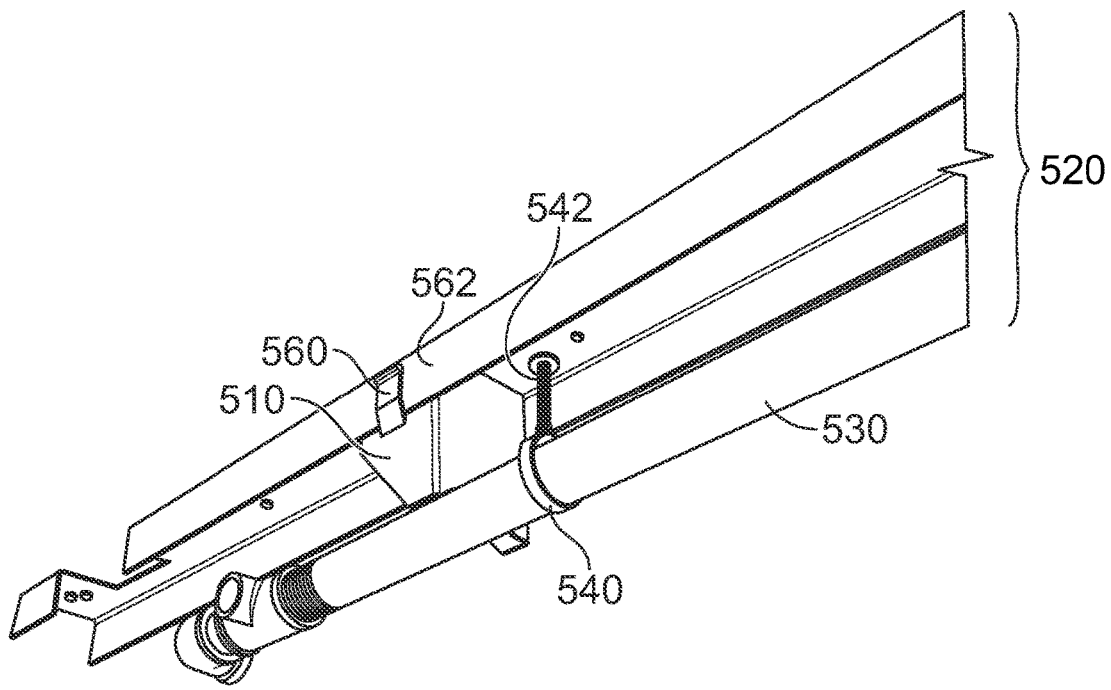
FIG. 5 illustrates the embodiment of FIG. 4 as installed in a ceiling track.

FIG. 5 illustrates the embodiment of FIG. 4 as installed in a ceiling track. As shown in FIG. 5, the bracket 510 has been engaged with the ceiling track 520 and a sprinkler pipe 530 has been engaged into the pipe guide of the bracket 510 and is held there by the action of the swivel ring 540 and the threaded bolt 542. The side flap of the bracket 510 includes a clip 560 that has been positioned along the exterior surface of the sidewall 562 of the ceiling track 520. The remaining sections of the side flap are positioned along the interior surface of the sidewall 562 of the ceiling track 520. As discussed above, the clip 560 generates a spring force with the other sections of the side flap so as to engage the sidewall 562 of the ceiling track 520 in a clamping action.

Additionally, as shown in FIG. 5, the topmost vertical extent of the clip 560 has been angled slightly outward and the clip 560 itself has been bent slightly inward. The inward bend of the clip 560 may serve to increase the clamping force onto the sidewall of the ceiling track generated by the clip. Further, the slight outward angel of the clip 560 at its topmost vertical extent may aid in grasping and bending the clip 560 during installation.

Figure 6:
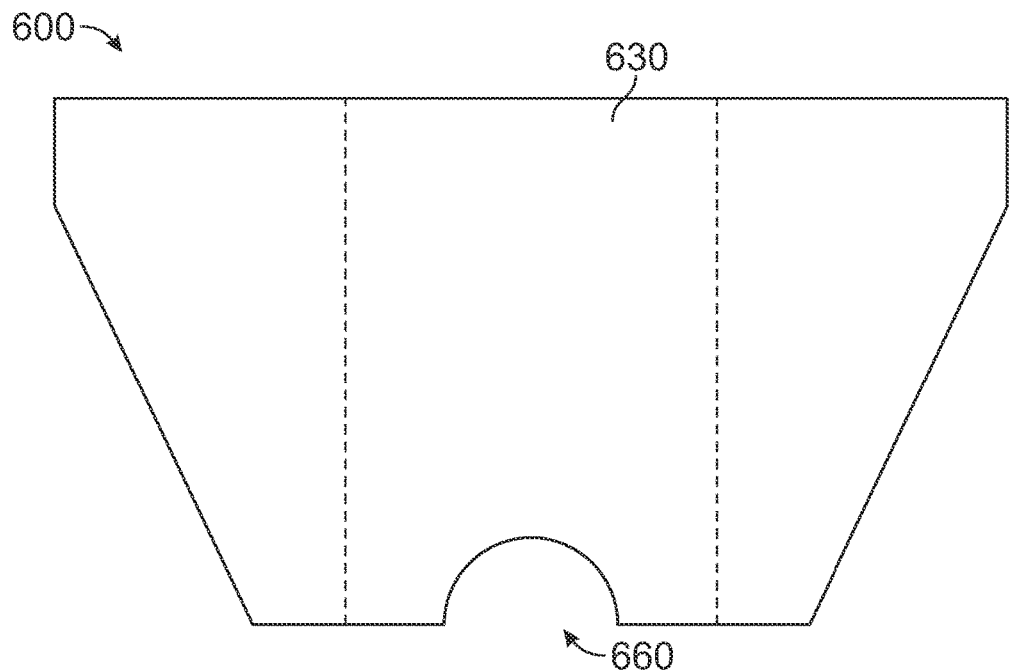
FIG. 6 illustrates an alternative embodiment with a center-positioned pipe guide.

FIG. 6 illustrates an alternative embodiment 600 with a center-positioned pipe guide 660. When 1" sprinkler pipe is being installed, the pipe guide 660 is reduced in size down to a 1⅜" semicircle, and is positioned centered on the vertical centerline of the center panel 630. The change in size of the pipe guide 660 fits the 1" pipe more snugly, and the change in position accommodates 1" fittings more appropriately. Further, although specific dimensions are mentioned throughout, any dimensions or configurations discussed in the present application may also be employed with this embodiment. The remaining aspects of FIG. 6 are similar to those of the embodiment of FIG. 1.

Figure 7:
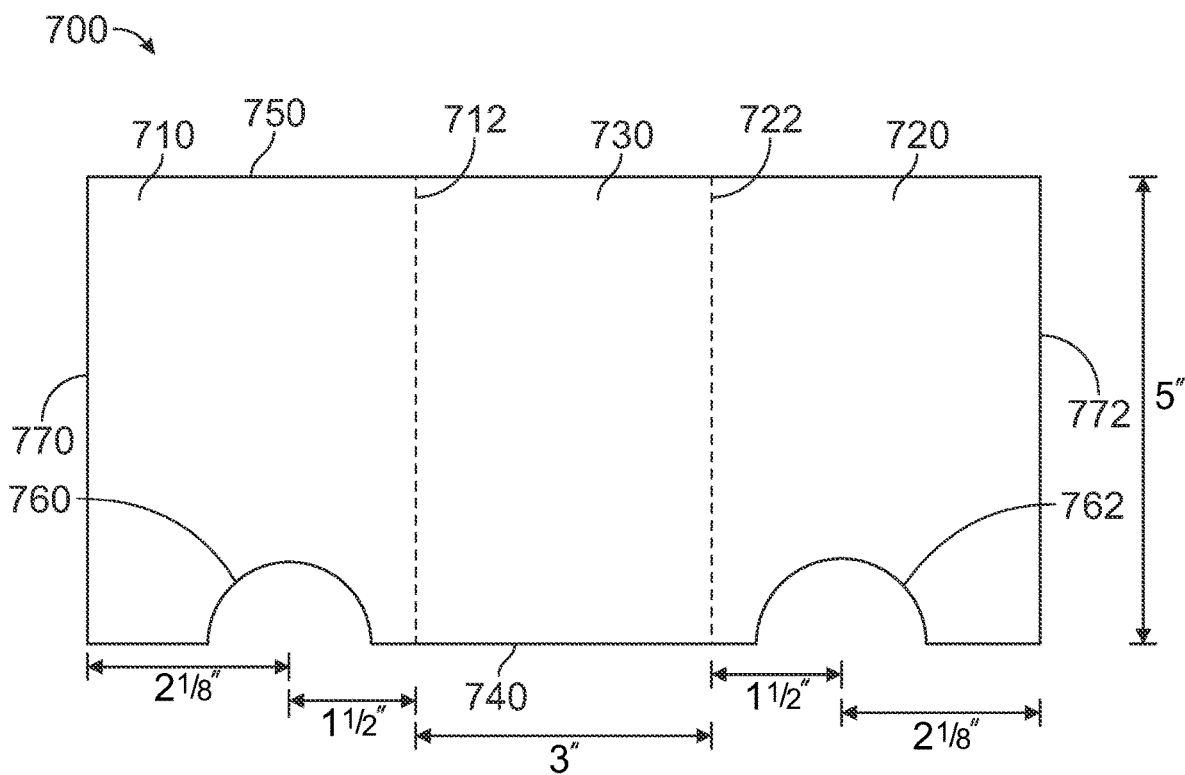
FIG. 7 illustrates and alternative embodiment of a bracket including two pipe guides.

FIG. 7 illustrates and alternative embodiment of a bracket 700 including two pipe guides. The bracket 700 includes a first side flap 710, a first fold line 712, a second side flap 720, a second fold line 722, a center panel 730, a bottom edge 740, a top edge 750, a first pipe guide 760, and a second pipe guide 720. Also shown are a first side flap outermost edge 770 and a second side flap outermost edge 772.

In operation, to alter the bracket 700 from the unfolded configuration shown in FIG. 7 to a folded configuration suitable for insertion in a steel top track, the first side flap 710 is folded backward from the center panel 730 along the first fold line 712 until the first side flap 710 is at an approximately almost 90 degree angle from the center panel 730. Next, the second side flap 720 is folded backward from the center panel 730 along the second fold line 722 until the second side flap 720 is at an approximately almost 90 degree angel from the center panel. The bracket 700 is now in its folded configuration and suitable for insertion to a steel top track.

As mentioned above, the top track includes a first side downwardly extending wall and a second side downwardly extending wall that are joined by a top track portion. Next, the bracket 700 is inserted into the steel top track by introducing the top edge 750 between the two downwardly extending walls and into proximity with the top track portion (as shown below in FIG. 8). Once inserted, the center panel 730 is in contact with the first side downwardly extending wall and the first side flap outermost edge 770 and the second side flap outermost edge 772 are in contact with the second side downwardly extending wall. Additionally, the bracket 700 may be retained between the first side downwardly extending wall and the second side downwardly extending wall due to spring force exerted between the outermost edges 770, 772 of the side flaps of the bracket and the center panel 730 onto the surrounding downwardly extending walls.

Once the bracket 700 has been positioned in the top track, a sprinkler pipe may be introduced into the pipe guides 760, 762. Next, a swivel ring is introduced around the sprinkler pipe and attached to a threaded rod that suspends from the ceiling between the first and second side downwardly extending walls of the track. The swivel ring is then tightened on the threaded rod so that the sprinkler pipe is induced upward into the pipe guides 760, 762. Because the bracket 700 is of solid construction, and the swivel ring keeps the sprinkler pipe firmly inserted in the pipe guides 760, 762, the sprinkler pipe is prevented from moving side-to-side relative to the track.

Similar to the embodiment of FIG. 1, the bracket 700 is composed of flat steel, preferably 20 gauge or thicker, although other gauges such as 14 and 16 gauge may be employed. The center panel 730 or face is 3" wide and the first side flap 710 and second side flap 720 are preferably 3⅝" wide. The bracket 700 is preferably 5" tall throughout. The 5" height dimension is adjustable to conform to local code and building design, for example, the sidewall sprinkler head may be anywhere from 4" to 6" down from deck as per national fire protection code. Consequently, the height of the bracket 700 may be adjusted to be anywhere between 4" to 6".

In the first side flap 710 and second side flap 720, the pipe guides 760, 762 may be a 1⅝" diameter hole that may be punched or drilled out, and may be offset 5/16" from the vertical center line. In one embodiment, the pipe guides 760, 762 are centered on the bottom of the first side flap 710 and second side flap 720, creating a semicircle.

The 5/16" offset from center is useful when 1¼" pipe is being installed because, depending on the outlet sizes on the 1¼" pipe fittings, the pipe may need to favor one side of the wall or the other. However, the present bracket 700 may easily provide an offset to either side of the wall by rotating the bracket 700 by 180 degrees when inserting the bracket 700 into the track.

The 3⅝" width of the first side flap 710 and second side flap 720 ensures a snug fit inside the top track. The square bends of the first and second side flaps provide structural integrity and prevent the bracket 700 from folding over as the pipe is drawn up into the pipe guides 760, 762 using the swivel ring. The template for the device is extremely straightforward. It is a simple rectangle, 9⅝" wide by 5" tall. Additionally, the side flaps generate a spring force that frictionally engages them with the interior side of the steel track.

As shown in the embodiment of FIG. 7, the cutouts for the pipe guides are located on both side flaps and the device is rotated ¼ turn from the position of the embodiment of FIG. 1 on the pipe as shown below. This embodiment provide great rigidity, and by cutting the side flaps to a width of 3-3-4" and softening the bend to slightly less than 90 degrees, a spring effect is created. This also frictionally engages the device to the top track. In this embodiment as well, the side flaps generate a spring force that frictionally engages them with the interior side of the steel track.

Figure 8:
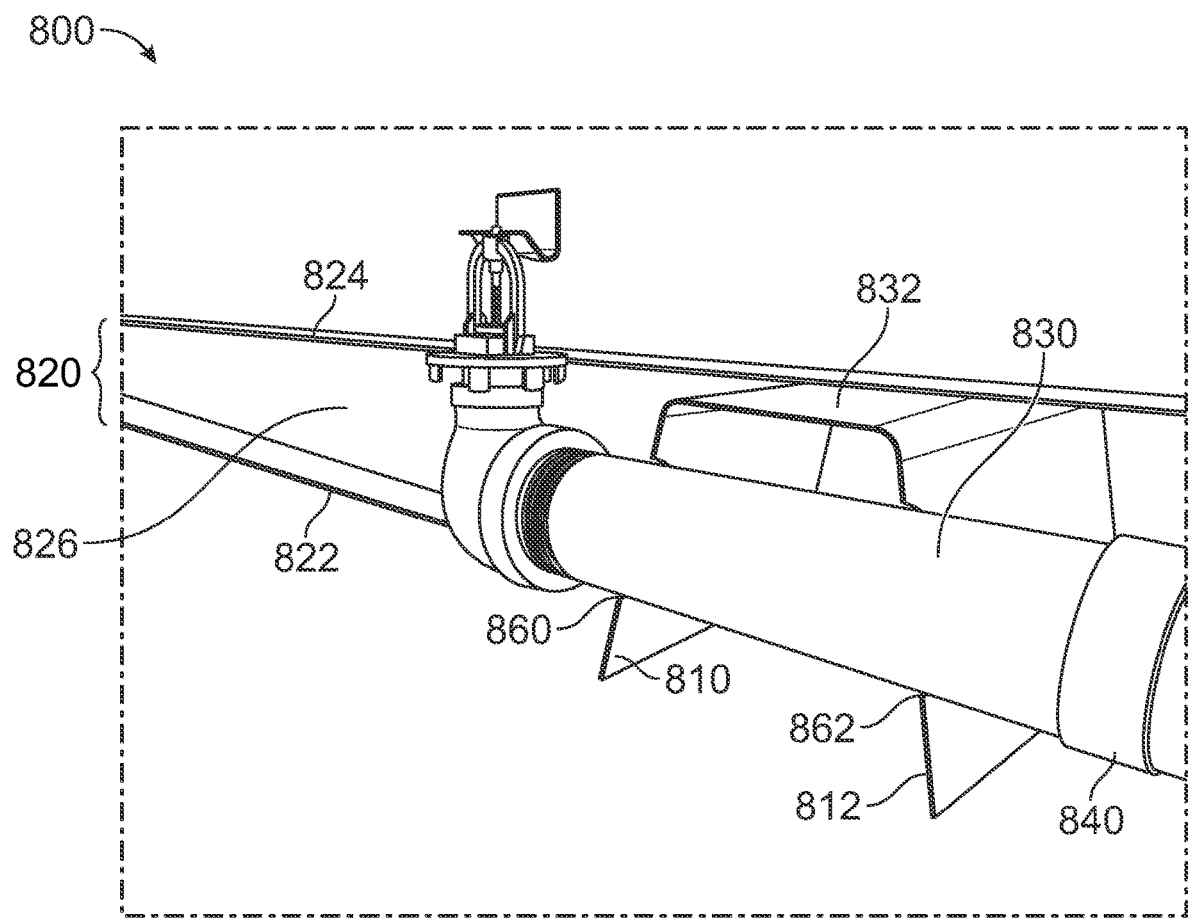
FIG. 8 illustrates the bracket of FIG. 7 in a folded configuration and installed in a ceiling track.

FIG. 8 illustrates the bracket of FIG. 7 in a folded configuration and installed in a ceiling track. FIG. 8 includes a bracket 800, a ceiling track 820, a sprinkler pipe 830, and a swivel ring 840. The bracket 800 includes a first side flap 810, a second side flap 812, a center panel 832, a first pipe guide 860, and a second pipe guide 862. The ceiling track 820 includes a first side downwardly extending wall 822, a second side downwardly extending wall 824 and a top track portion 826.

As mentioned above, as shown in FIG. 2, the bracket 800 has been folded along the fold lines indicated in FIG. 7 so that the first side flap 810 and second side flap 812 form nearly 90 degree angles with the center panel 832. The first side flap 810 and second side flap 812 may then be slightly mechanically induced away from each other by an installer so that the bracket 800 may be inserted into the ceiling track 820 as shown so that the top edge of the bracket 800 is brought into proximity and/or abutment with the top track portion 826 that runs along the ceiling. The first side flap 810 and second side flap 812 may then be released be the installer and a spring force provided by the folding configuration of the first side flap 810 and second side flap 812 relative to the center panel 832 may then induce the outermost edges of the first side flap 810 and second side flap 812 into contact and/or frictional engagement with the ceiling track's 820 first side downwardly extending wall 822 and induce the center panel 832 into contact and/or frictional engagement with the ceiling track's second side downwardly extending wall 824.

Next, the sprinkler pipe 830 is introduced into the pipe guides 860, 862. Then, the swivel ring 840 is introduced around the sprinkler pipe and attached to the threaded rod that suspends from the ceiling between the first and second side downwardly extending walls of the track. The swivel ring 840 is then tightened on the threaded rod so that the sprinkler pipe 830 is firmly seated in the pipe guides 860, 862. Once the swivel ring 840 is tightened, the sprinkler pipe 830 is prevented from moving side-to-side relative to the ceiling track 820.

Figure 9:
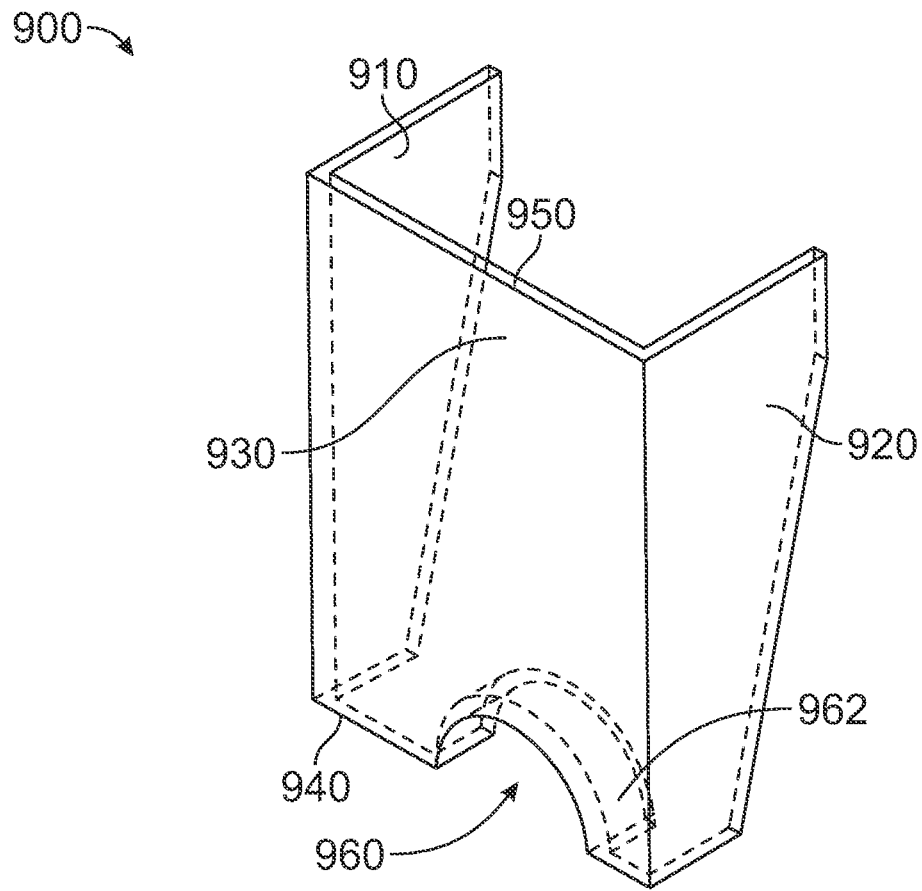
FIG. 9 illustrates an alternative embodiment of the bracket having an offset pipe guide and an extended pipe guide rim.

FIG. 9 illustrates an alternative embodiment of the bracket 900 having an offset pipe guide and an extended pipe guide rim. As shown in FIG. 9, the bracket 900 includes a first side flap 910, a second side flap 920, a center panel 930, a bottom edge 940, a top edge 950, and a pipe guide 960 having a pipe guide rim 962.

In operation, the bracket 900 of FIG. 9 operates similarly to the other embodiments disclosed herein except that the bracket 900 may be pre-formed out of high density plastic and the bracket 900 is equipped with a ½" pipe guide rim 962 or lip surrounding the rim of pipe guide 960. The pipe guide rim effectively maintains a perpendicular position of the bracket 900 to the sprinkler pipe as the sprinkler pipe is raised into the pipe guide 960 by the action of the swivel ring and threaded rod.

As shown in FIG. 9, the center panel 930 is 3.625" wide by 5" tall with a 1.625" diameter semicircle cutout. The pipe guide 960 is offset 0.3125" or 5/16" from the vertical center line and bisected by the bottom of the bracket. The pipe guide rim is a ½" lip on the back side of the pipe guide 960 and surrounds the pipe guide 960. The side flaps are 2" wide at the top and taper down to 1" at the bottom. The bracket is generally 0.125" thick throughout.

In the embodiment of FIG. 9, when the bracket 900 is installed in a ceiling-mounted track, the upper edge of the first side flap 910, second side flap 920, and center panel 930, generally abut the horizontal ceiling or track to as to prevent the bracket from rocking in the dimension in-line with the pipe—or side-to-side. The addition of the pipe guide rim 962 generally abuts the sprinkler pipe itself and further prevents the bracket from rocking in the dimension in-line with the pipe.

The embodiment of FIG. 9 maybe composed of flat steel, preferably 20 gauge, or a high density plastic, with two ninety degree bends. The advantage of plastic is that it can be molded into the desired embodiment, as opposed to cutting, punching, and bending steel. In the instance that the device is composed of plastic, a ½" lip or pipe guide rim 962 flaps may be included around the rim of the pipe guide 960. This is an extremely effective way of preventing any folding of the bracket as the line piping is raised into position, as the bracket is held perpendicular by the pipe guide rim 962 encountering the flat surface of the sprinkler pipe.

Further, although specific dimensions are mentioned above, any dimensions or configurations discussed in the present application may also be employed with this embodiment.

Figure 10:
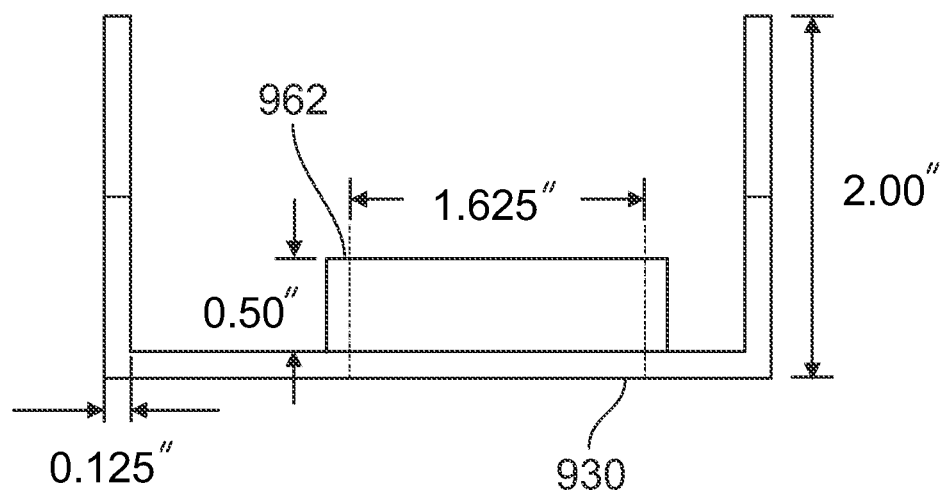
FIG. 10 illustrates a top view of the bracket of FIG. 9.

FIG. 10 illustrates a top view of the bracket 900 of FIG. 9.

Figure 11:
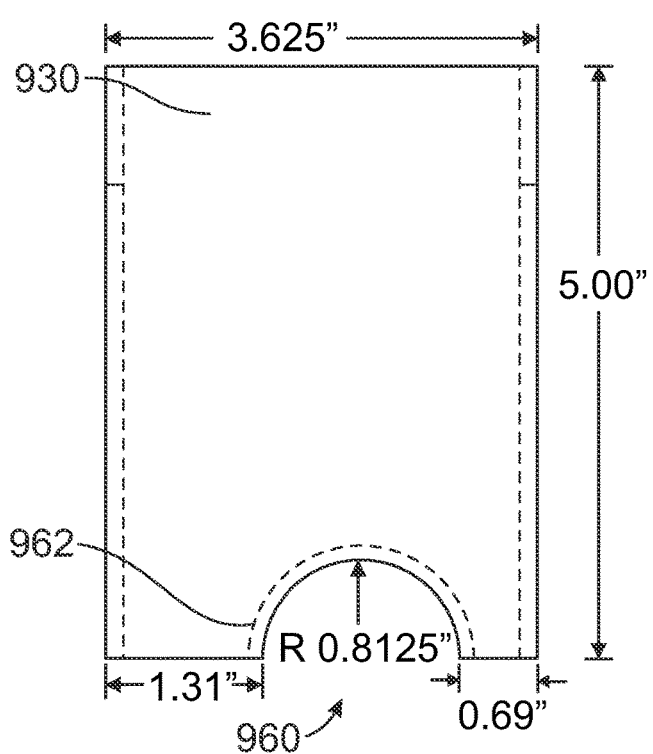
FIG. 11 illustrates a front view of the bracket of FIG. 9.

FIG. 11 illustrates a front view of the bracket 900 of FIG. 9.

Figure 12:
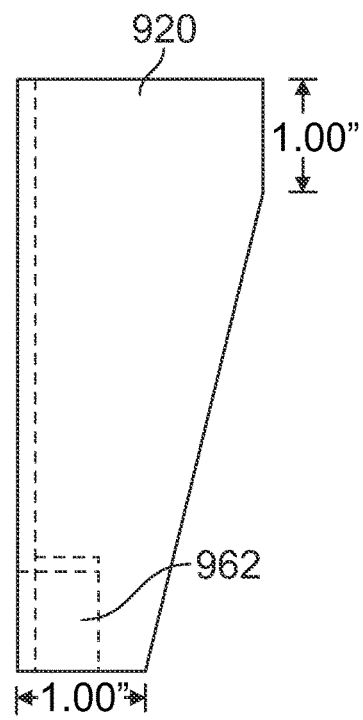
FIG. 12 illustrates a side view of the bracket of FIG. 9.

FIG. 12 illustrates a side view of the bracket 900 of FIG. 9.

Figure 13:
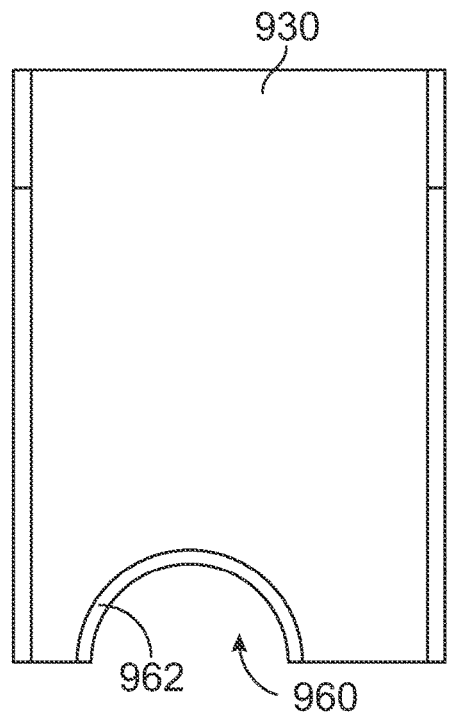
FIG. 13 illustrates a rear view of the bracket of FIG. 9.

FIG. 13 illustrates a rear view of the bracket 900 of FIG. 9.

Figure 14:
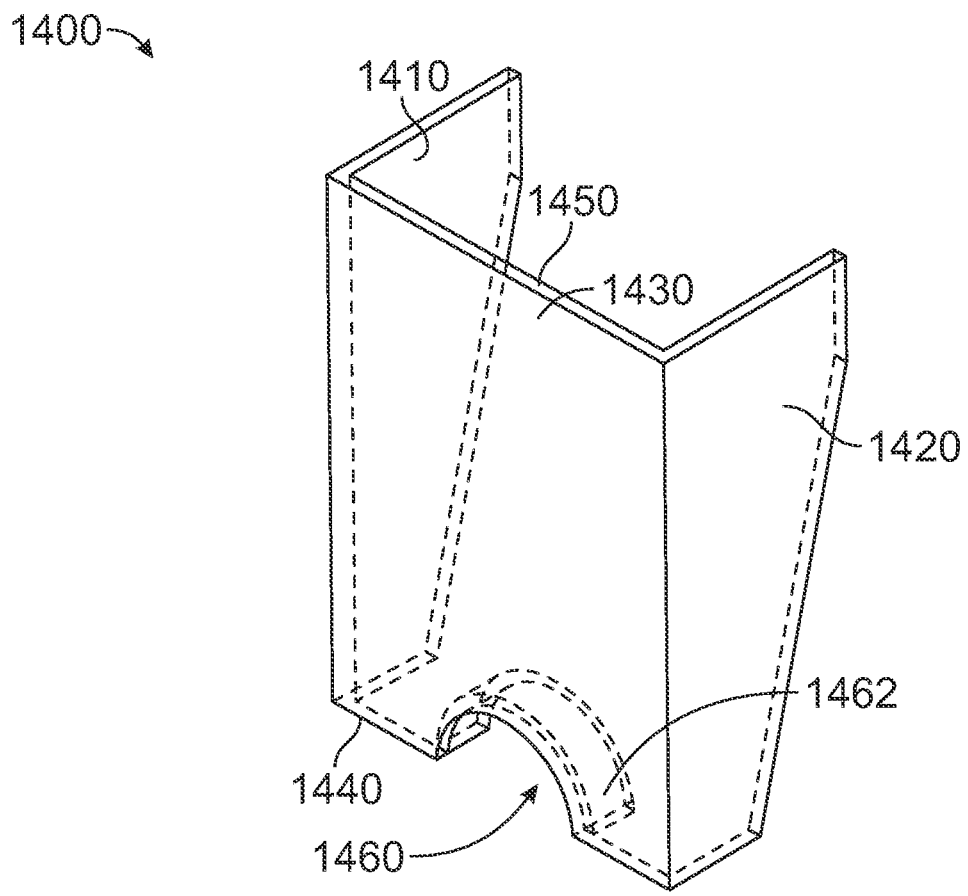
FIG. 14 illustrates an alternative embodiment of the bracket having a centered pipe guide and an extended pipe guide rim.

FIG. 14 illustrates an alternative embodiment of the bracket 1400 having a centered pipe guide and an extended pipe guide rim. As shown in FIG. 14, the bracket 1400 includes a first side flap 1410, a second side flap 1420, a center panel 1430, a bottom edge 1440, a top edge 1450, and a pipe guide 1460 having a pipe guide rim 1462.

In operation, the bracket 1400 of FIG. 14 operates similarly to the bracket of FIG. 1, except the pipe guide 1460 is centered and somewhat smaller in size to accommodate 1" piping. The bracket 1400 may be pre-formed out of high density plastic and the bracket 1400 is equipped with a ½" pipe guide rim 1462 or lip surrounding the rim of pipe guide 1460. The pipe guide rim effectively maintains a perpendicular position of the bracket 1400 to the sprinkler pipe as the sprinkler pipe is raised into the pipe guide 1460 by the action of the swivel ring and threaded rod.

As shown in FIG. 14, the center panel 1430 is 3.625" wide by 5" tall with a 1.375" diameter semicircle cutout. The pipe guide 1460 is centered in the middle of the bottom edge 1440 of the center panel 1430. The pipe guide rim is a ½" lip on the back side of the pipe guide 1460 and surrounds the pipe guide 1460. The side flaps are 2" wide at the top and taper down to 1" at the bottom. The bracket is generally 0.125" thick throughout.

Figure 15:
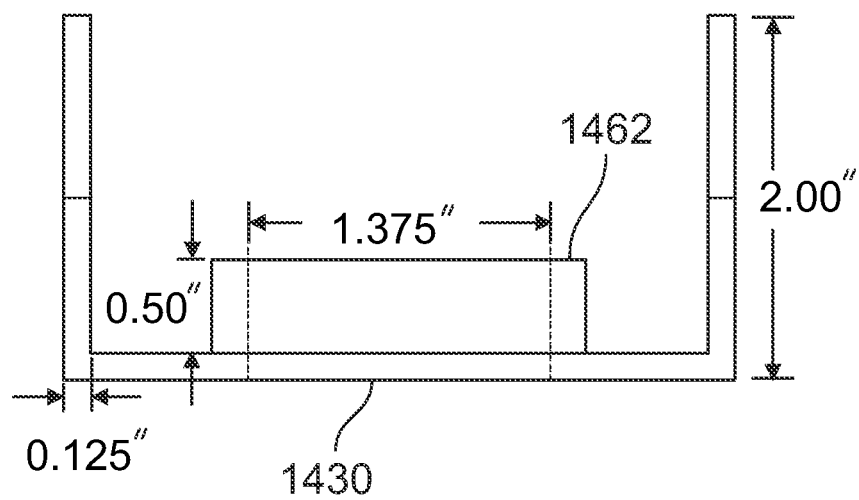
FIG. 15 illustrates a top view of the bracket of FIG. 14.

FIG. 15 illustrates a top view of the bracket 1400 of FIG. 14.

Figure 16:
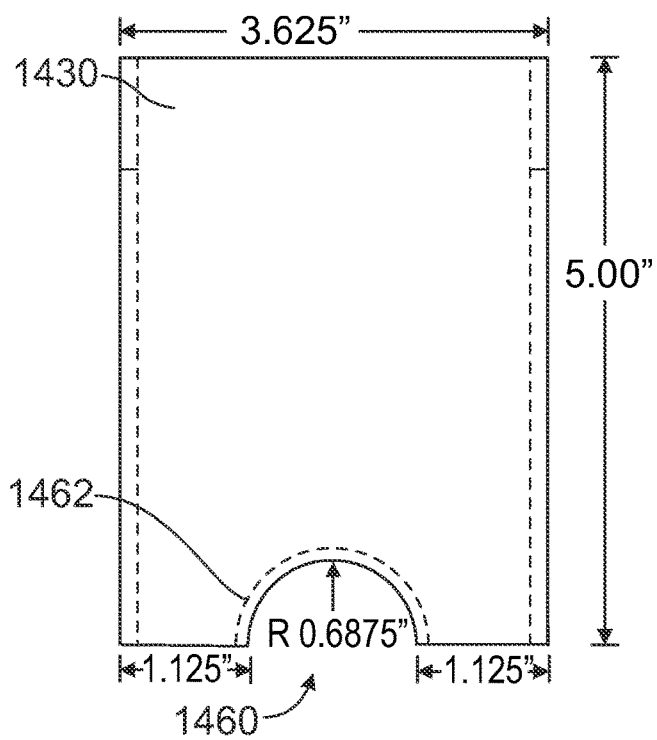
FIG. 16 illustrates a front view of the bracket of FIG. 14.

FIG. 16 illustrates a front view of the bracket 1400 of FIG. 14.

Figure 17:
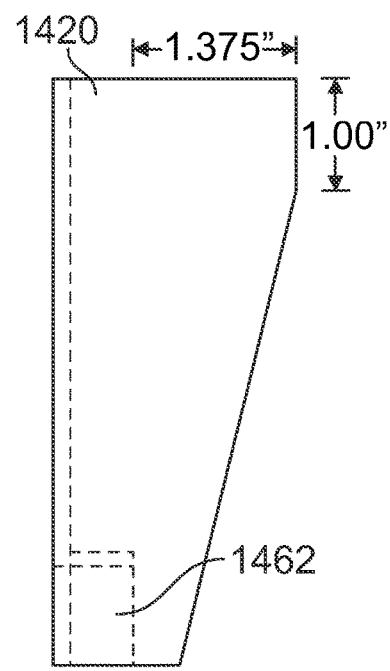
FIG. 17 illustrates a side view of the bracket of FIG. 14.

FIG. 17 illustrates a side view of the bracket 1400 of FIG. 14.

Figure 18:
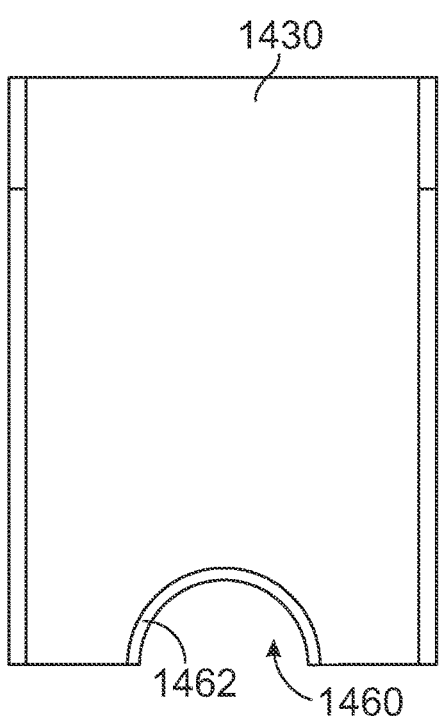
FIG. 18 illustrates a rear view of the bracket of FIG. 14.

FIG. 18 illustrates a rear view of the bracket 1400 of FIG. 14.

Figure 19:
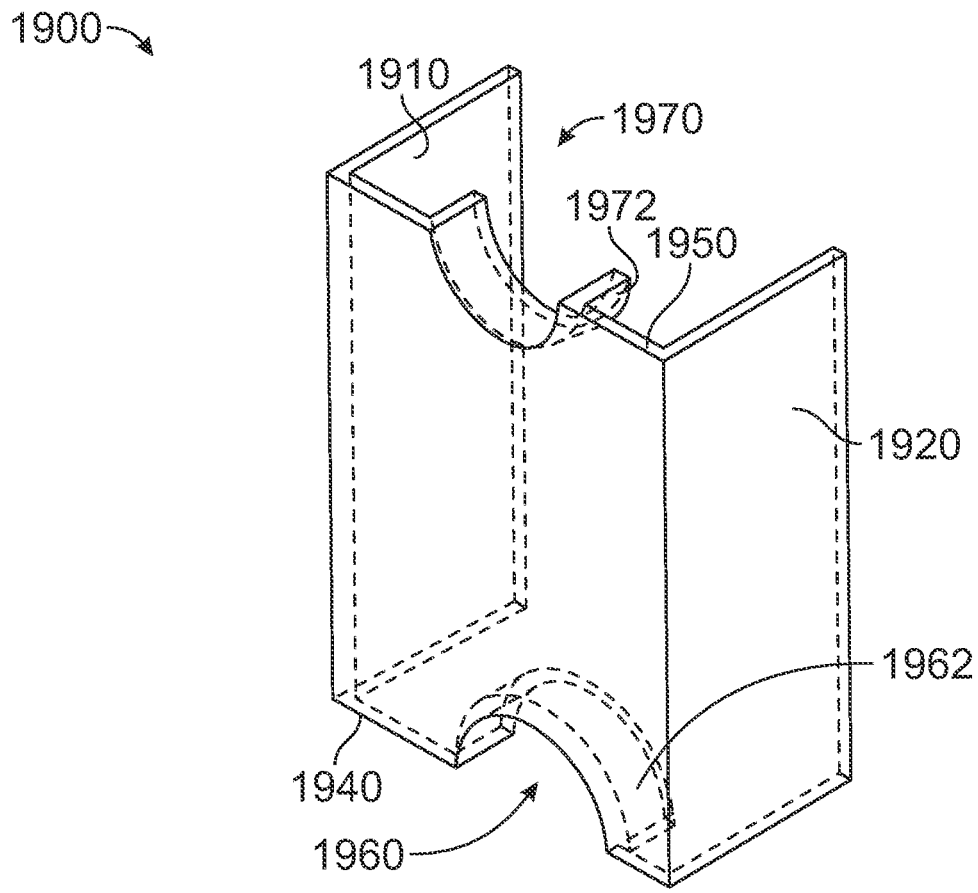
FIG. 19 illustrates an alternative embodiment of the bracket having a two pipe guides of different sizes.

FIG. 19 illustrates an alternative embodiment of the bracket 1900 having a two pipe guides of different sizes. As shown in FIG. 19, the bracket 1900 includes a first side flap 1910, a second side flap 1920, a center panel 1930, a bottom edge 1940, a top edge 1950, a first pipe guide 1960 having a first pipe guide rim 1962, and a second pipe guide 1970 having a second pipe guide rim 1972.

In operation, the bracket 1900 of FIG. 19 operates similarly to the brackets of FIGS. 1, 9 and 14, except the bracket 1900 includes a first pipe guide 1960 that is offset from the centerline of the center panel 1930 and suitable for use with 1¼" sprinkler pipe as well as a second pipe guide 1970 that is centered in the center panel 1930 and suitable for use with 1" pipe. One advantage of the bracket 1900 is that a single bracket may be used for both 1" and 1¼" piping by merely inverting the bracket. Additionally, instead of the first side flap 1910 and second side flap 1920 having an angled cutout as in FIGS. 9 and 14, the first side flap 1910 and second side flap 1920 are rectangular. This done so that regardless of whether the first pipe guide 1960 or second pipe guide 1970 is in use, the bracket 1900 offers 2" of contact between the ceiling track and the upper surface of the bracket 1900 in order to promote stability.

The bracket 1900 may be pre-formed out of high density plastic and the bracket 1900 is equipped with ½" pipe guide rims 1962, 1972 or lips surrounding the rim of pipe guides 1960, 1970. The pipe guide rims 1962, 1972 effectively maintain a perpendicular position of the bracket 1900 to the sprinkler pipe as the sprinkler pipe is raised into the pipe guide 1960 by the action of the swivel ring and threaded rod—regardless of whether the first pipe guide 1960 or second pipe guide 1970 is being employed to receive the sprinkler pipe.

As shown in FIG. 19, the center panel 1930 is 3.625" wide by 5" tall with 1.63" diameter semicircle cutout for the first pipe guide 1960 and a 1.375" diameter semicircle cutout for the second pipe guide 1970. As shown in the figure, the first pipe guide 1960 in the bottom edge 1940 is offset 0.3125" or 5/16" from the vertical center line and bisected by the bottom of the bracket. The second pipe guide 1970 is centered in the middle of the top edge 1950 of the center panel 1930. The second pipe guide rim 1972 is a ½" lip on the back side of the second pipe guide 1970 and surrounds the pipe guide 1970. The side flaps are rectangular and 2" wide. The bracket is generally 0.125" thick throughout.

The embodiment of FIG. 19 combines both 1¼" and 1" pipe knockouts on the same device. The side flaps remain at a 2" width throughout in order to maintain structural integrity and the lip or pipe guide rims remain around the perimeter of the knockouts of the pipe guides to ensure the bracket stays perpendicular to the sprinkler pipe throughout installation. By simply inverting the bracket, the installer has the option of using the bracket for either 1" or 1¼" pipe.

Figure 20:
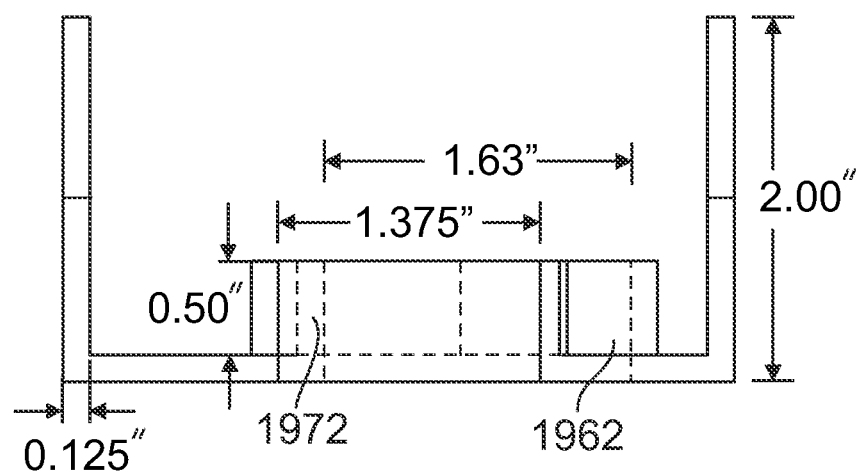
FIG. 20 illustrates a top view of the bracket of FIG. 19.

FIG. 20 illustrates a top view of the bracket 1900 of FIG. 19.

Figure 21:
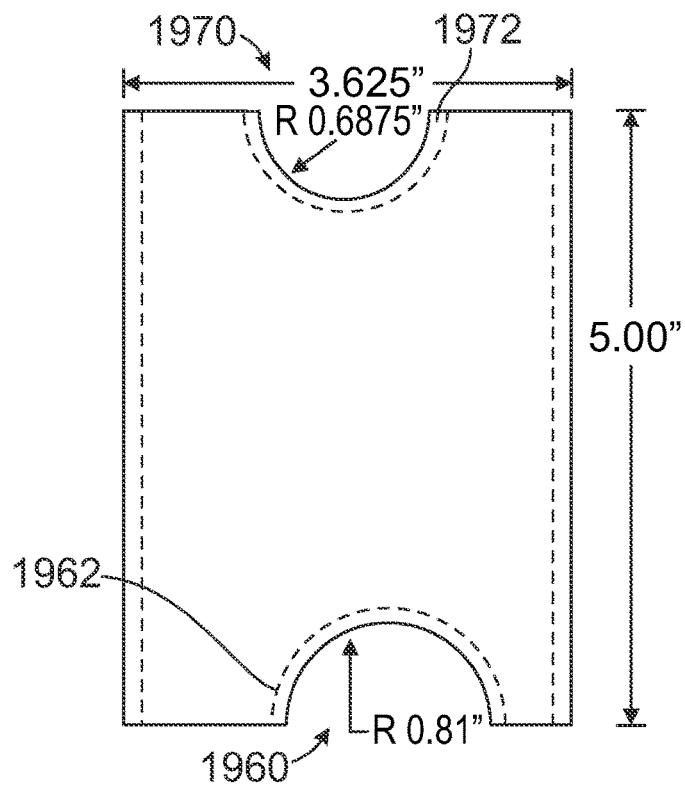
FIG. 21 illustrates a front view of the bracket of FIG. 19.

FIG. 21 illustrates a front view of the bracket 1900 of FIG. 19.

Figure 22:
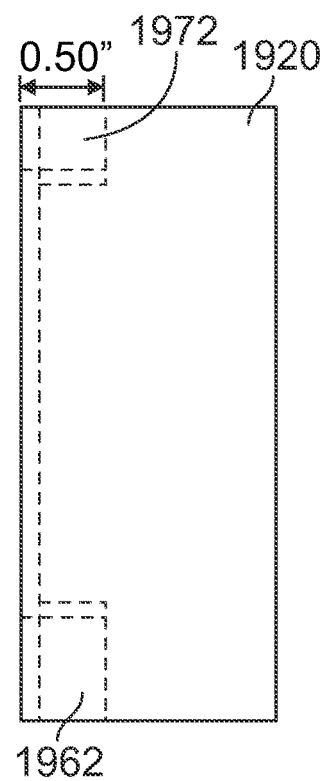
FIG. 22 illustrates a side view of the bracket of FIG. 19.

FIG. 22 illustrates a side view of the bracket 1900 of FIG. 19.

Figure 23:
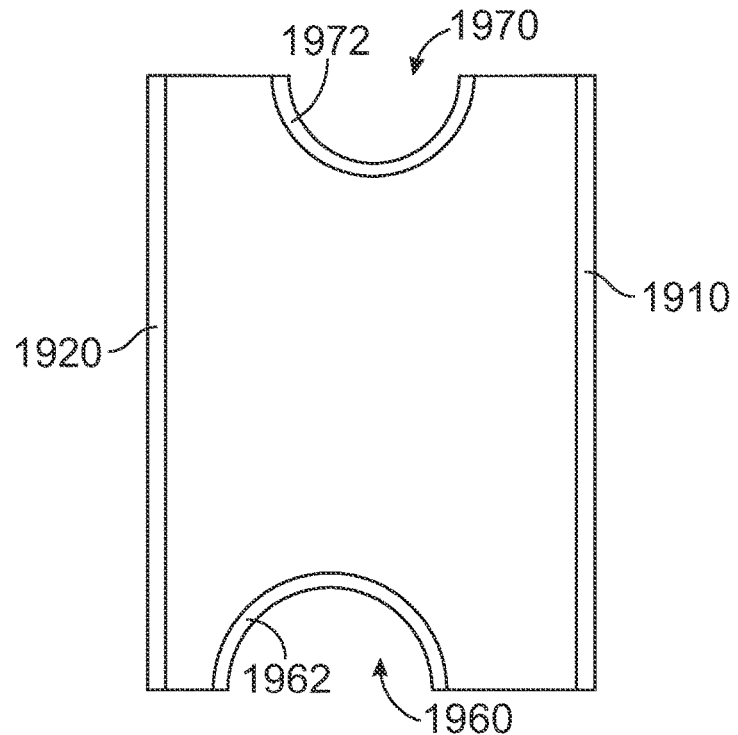
FIG. 23 illustrates a rear view of the bracket of FIG. 19.

FIG. 23 illustrates a rear view of the bracket 1900 of FIG. 19.

Although there are currently a number of solutions for supporting in-wall sprinkler line piping, none provide the advantages of one or more embodiments of the current invention. For example, the swivel ring is great for its load capacity and height adjustability, but it doesn't restrict any side-to-side movement. Additionally, the surge clip prevents pipe up-and-down fluctuation due to sprinkler head activation, but once again, side-to-side movement of the pipe is not constrained. Although the split ring restrains movement in all directions, the problem with the split ring is that once the pipe is secured, it cannot be spun. With threaded pipe, that isn't an option because spinning the pipe is required.

One or more embodiments of the present invention are unique in that they provide the installer the ideal in-wall depth of his fire sprinkler line with quick, easy, fixed installation. The present bracket also works in tandem with the most commonly used hanger system of swivel ring and threaded rod, and the bracket locks the pipe in position to prevent undesired lateral displacement.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A bracket for securing fire sprinkler line piping, said bracket including:
   a center panel including a center panel top edge and a center panel bottom edge;
   a first side flap attached to a first side of said center panel, wherein said first side flap is positioned at an angle of approximately 90 degrees from said center panel, wherein said first side flap includes a first side flap top edge;
   a second side flap attached to a second side of said center panel, wherein said second side flap is positioned at an angle of approximately 90 degrees from said center panel, wherein said second side flap includes a second side flap top edge; and
   a pipe guide disposed as a recess along said center panel bottom edge, wherein said bracket is configured to be inserted into a ceiling track having a first track side and a second track side so that said first side flap is frictionally engaged with said first track side and said second side flap is frictionally engaged with said second track side,
   wherein said center panel top edge is configured to be in contact with said ceiling track when installed,
   wherein said first side flap top edge is configured to be in contact with said ceiling track when installed,
   wherein said second side flap top edge is configured to be in contact with said ceiling track when installed,
   wherein a sprinkler line pipe is receivable in said pipe guide so that lateral movement of said sprinkler line pipe relative to said ceiling track is constrained.

2. The bracket of claim 1 wherein at least one of said first side flap and said second side flap includes a clip, wherein said at least one clip is engageable with at least one of the first track side and the second track side of said ceiling track.

3. The bracket of claim 1 wherein said pipe guide is centered along the bottom edge of said center panel.

4. The bracket of claim 1 wherein said pipe guide is offset from the center of said bottom edge of said center panel.

5. The bracket of claim 1 wherein said pipe guide includes a pipe guide rim comprising a protrusion at least partially surrounding said pipe guide.

6. The bracket of claim 1 further including a second pipe guide disposed as a recess along a top edge of said center panel, wherein said bracket is invertible so that either said pipe guide or said second pipe guide may be used to receive sprinkler line pipe.

* * * * *